(12) United States Patent
Wang et al.

(10) Patent No.: US 11,744,223 B2
(45) Date of Patent: Sep. 5, 2023

(54) SELF-ADAPTIVE PRECISE VENTILATION SYSTEM FOR LIVESTOCK AND POULTRY HOUSE

(71) Applicant: Zhejiang University, Hangzhou (CN)

(72) Inventors: Xiaoshuai Wang, Hangzhou (CN); Mengbing Cao, Hangzhou (CN); Feiyue Hu, Hangzhou (CN); Kaiying Wang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/734,590

(22) Filed: May 2, 2022

(65) Prior Publication Data

US 2023/0142368 A1    May 11, 2023

(51) Int. Cl.
| | |
|---|---|
| *A01K 1/00* | (2006.01) |
| *F24F 13/10* | (2006.01) |
| *A01K 29/00* | (2006.01) |
| *F24F 11/00* | (2018.01) |
| *F24F 110/20* | (2018.01) |
| *F24F 110/10* | (2018.01) |

(52) U.S. Cl.
CPC ............ *A01K 1/0076* (2013.01); *A01K 29/00* (2013.01); *F24F 11/0001* (2013.01); *F24F 13/10* (2013.01); *F24F 2110/10* (2018.01); *F24F 2110/20* (2018.01)

(58) Field of Classification Search
CPC ... A01K 1/0076; A01K 29/00; F24F 11/0001; F24F 13/10; F24F 2110/10; F24F 2110/20
USPC .......................................... 454/370; 119/448
See application file for complete search history.

(56) References Cited

U.S. PATENT DOCUMENTS

| | | | |
|---|---|---|---|
| 10,798,917 B2* | 10/2020 | Karsijns | ................. B25J 9/1697 |
| 10,813,191 B2* | 10/2020 | Theobald | ................ A01K 45/00 |
| 2016/0120144 A1* | 5/2016 | Kim | ..................... A01K 1/0052 |
| | | | 119/436 |

* cited by examiner

*Primary Examiner* — Edelmira Bosques
*Assistant Examiner* — Dana K Tighe
(74) *Attorney, Agent, or Firm* — Yanjun Ma; DeWitt LLP

(57) ABSTRACT

Disclosed is a self-adaptive precise ventilation system for a livestock and poultry house. The system comprises an air pipe, an adjusting assembly, a camera shooting assembly, air flow test pieces and a controller; the air pipe and the air flow test pieces are all arranged above fence areas, the camera shooting assembly is installed on one side of each of the air flow test pieces, and the adjusting assembly is connected together with the air pipe through connecting ropes; a plurality of air supply outlets are formed in the air pipe, and each air supply outlet is provided with a valve; and the camera shooting assembly monitors the air flow conditions in the livestock and poultry house and the information of in-fence areas, and transmits the them to the controller so as to determine the opening degrees and the orientations of the air supply outlets and realize precise air supply.

10 Claims, 3 Drawing Sheets

SELF-ADAPTIVE PRECISE VENTILATION SYSTEM FOR LIVESTOCK AND POULTRY HOUSE

CROSS REFERENCE TO RELATED APPLICATION

This patent application claims the benefit and priority of Chinese Patent Application No. 202111326118.X, filed on Nov. 10, 2021, the disclosure of which is incorporated by reference herein in its entirety as part of the present application.

TECHNICAL FIELD

The present disclosure relates to the technical field of fresh air and automation control, in particular to a self-adaptive precise ventilation system for a livestock and poultry house.

BACKGROUND ART

The ventilation efficiency of the livestock and poultry house in summer has an important influence on the production performance of livestock and poultry, and good ventilation is the key for improving the yield and quality of livestock husbandry. Under the condition of natural ventilation, it is difficult to guarantee that the ventilation of the livestock and poultry house is uniform and controllable all day long. In the existing tunnel ventilation system with wet pad cooling, it is difficult to precisely cool individual animals. Air ducting system can guarantee that cool air is supplied to the animal occupied zone. However, the existing air ducting technology poorly performs against the bulk movement of indoor air, and lacks automatic and precise ventilation regulation and control according to animal requirements for the local living environment. The issue of local heat stress caused by imprecise ventilation regulation and control in the livestock and poultry house can seriously affect the health of livestock and poultry and reduce the yield and quality of the productions. Therefore, precise ventilation of the livestock and poultry house is achieved, and the environment comfort of the livestock and poultry area is guaranteed to be important for livestock and poultry health and output.

SUMMARY

The present disclosure aims to provide a self-adaptive precise ventilation system for a livestock and poultry house so as to achieve the purpose of automatic and precise air supply for the livestock and poultry house.

In order to achieve the purpose, the present disclosure provides the following scheme:

Disclosed is a self-adaptive precise ventilation system for a livestock and poultry house, wherein the livestock and poultry house is provided with a plurality of fence areas; the self-adaptive precise ventilation system for a livestock and poultry house comprises an air pipe, an adjusting assembly, a camera shooting assembly, air flow test pieces and a controller;

the air pipe and the air flow test pieces are all arranged above the fence areas, the camera shooting assembly is installed on one side of each of the air flow test pieces, and the adjusting assembly is connected together with the air pipe through connecting ropes; wherein, a plurality of air supply outlets are formed in the air pipe, and each air supply outlet is provided with a valve;

the camera shooting assembly is used for processing collected air flow test piece images, and determining air flow information in the livestock and poultry house, wherein the air flow information comprises the air flow speed and the air flow direction; and processing collected in-fence area images, and determining in-fence area information in the livestock and poultry house, wherein the in-fence area information comprises whether livestock animals exist in each in-fence area or not and the posture information of the livestock animals when the livestock animals exist in the in-fence areas; and the controller is used for acquiring the air flow information and the in-fence area information;

controlling the valves to work based on the in-fence area information, and then adjusting the opening degrees of the air supply outlets; and controlling the adjusting assembly to work based on the air flow information, and then adjusting the orientations of the air supply outlets.

Optionally, the self-adaptive precise ventilation system for a livestock and poultry house further comprises a cooling air supply device communicating with the input end of the air pipe and a temperature and humidity sensor arranged in the livestock and poultry house;

the temperature and humidity sensor is used for acquiring temperature and humidity information in the livestock and poultry house; and the controller is used for acquiring the temperature and humidity information and controlling the cooling air supply device to work according to the temperature and humidity information so as to adjust the air speed output by the air supply outlets.

Optionally, the number of the air supply outlets is the same as that of the in-fence areas, and the air supply outlets are in one-to-one correspondence with the in-fence areas.

Optionally, the size of the air supply outlet is determined through fluid mechanics calculation software simulation.

Optionally, the two ends of the connecting rope are tied to the adjusting assembly to form an annular rope; the air pipe penetrates through all the annular ropes, so that the adjusting assembly is connected together with the air pipe through a plurality of connecting ropes; and a connecting rope is arranged between every two adjacent air supply outlets.

Optionally, the adjusting assembly comprises a horizontal displacement adjusting mechanism and a circumferential rotating mechanism; the circumferential rotating mechanism is nested in the horizontal displacement adjusting mechanism;

when the horizontal displacement adjusting mechanism works, the circumferential rotating mechanism moves horizontally along with the air pipe; and when the circumferential rotating mechanism works, the lengths of the connecting ropes hung on the two sides of the air pipe are changed, so that the air pipe rotates in the circumferential direction and drives the air supply outlets to rotate.

Optionally, the camera shooting assembly comprises a camera and an auxiliary part connected with the camera; image analysis software based on machine vision is arranged in the camera;

the camera is used for collecting air flow test piece images and in-fence area images;

processing the air flow test piece images by adopting the image analysis software based on machine vision to determine the air flow information in the livestock and poultry house; and processing the in-fence area images by adopting the image analysis software based on machine vision to determine the in-fence area information in the livestock and poultry house.

Optionally, in the aspect of controlling the valves to work based on the in-fence area information and then adjusting the opening degrees of the air supply outlets, the controller is used for controlling the valves corresponding to calibrated in-fence areas to start to work when the livestock animals to exist in the calibrated in-fence areas, increasing the opening degrees of the air supply outlets through the valves corresponding to the calibrated in-fence areas when the posture information of the livestock animals in the calibrated in-fence areas is a standing posture, and decreasing the opening degrees of the air supply outlets through the valves corresponding to the calibrated in-fence areas when the posture information of the livestock animals in the calibrated in-fence areas is a lying posture, wherein the calibrated in-fence areas are arbitrary in-fence areas; and in the aspect of controlling the adjusting assembly to work based on the air flow information and then adjusting the orientations of the air supply outlets, the controller is used for controlling the adjusting assembly to work based on the air flow information so as to circumferentially and/or axially adjust the air pipe, so that the air flow acts on the calibrated in-fence areas.

Optionally, the cooling air supply device is an air cooler, an air-soil exchanger or a ground source heat pump.

Optionally, the air flow test piece is a light ribbon; and the air pipe is a fiber air pipe.

According to the specific embodiment provided by the present disclosure, the present disclosure has the following technical effects:

According to the self-adaptive precise ventilation system for a livestock and poultry house provided by the embodiment, real-time adjustment can be carried out according to the internal air flow conditions of the open-type scattered fence livestock and poultry house, so that the purpose of precise air supply of the livestock and poultry house is achieved; and specifically, the air flow conditions (including the air flow speed and the air flow direction) in the livestock and poultry house are monitored in real time, the air flow conditions are transmitted to the controller, and the controller determines the opening of the air supply outlets and the orientations of the air supply outlets according to the air flow conditions and whether livestock animals exist in fences or not and posture information of the animals, so that precise air supply is achieved.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

To make the foregoing objective, features and advantages of the present disclosure clearer and more comprehensible, the present disclosure is further described in detail below with reference to the attached figures and specific embodiments.

Embodiment I

The embodiment designs a cow house self-adaptive precise ventilation system capable of adjusting the air supply angle in real time according to the air flow conditions in an open-type scattered fence feeding dairy cow house. The system comprises a camera, a controller, an air cooler, a fiber air pipe, light ribbons, and other facilities. The system can monitor the air flow conditions above dairy cow fence areas, whether dairy cows exist in fences and the condition that the dairy cows stand and lie down in real time through the camera and matched analysis equipment, and transmits related data to the controller, and the controller adjusts the orientations and the opening degrees of the air supply outlets in real time through the related data, so that the purpose of precisely delivering fresh air to the area where the dairy cows are located is achieved.

Figure 1:
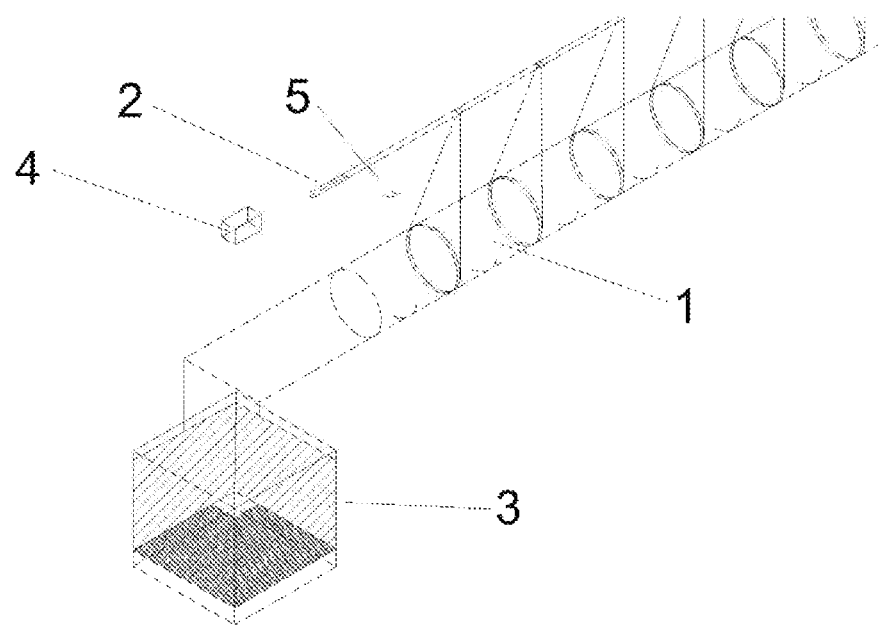
FIG. 1 is a structural schematic diagram of a self-adaptive precise ventilation system for a cow house in the present disclosure.

As shown in FIG. 1, the cow house self-adaptive precise ventilation system provided by the embodiment comprises a fiber air pipe 1 for precise ventilation, an adjusting assembly 2, an air cooler 3, a camera 4, light ribbons 5, a controller (unshown in the figure of the integral structure) and a temperature and humidity sensor (unshown in the figure of the integral structure).

Figure 2:
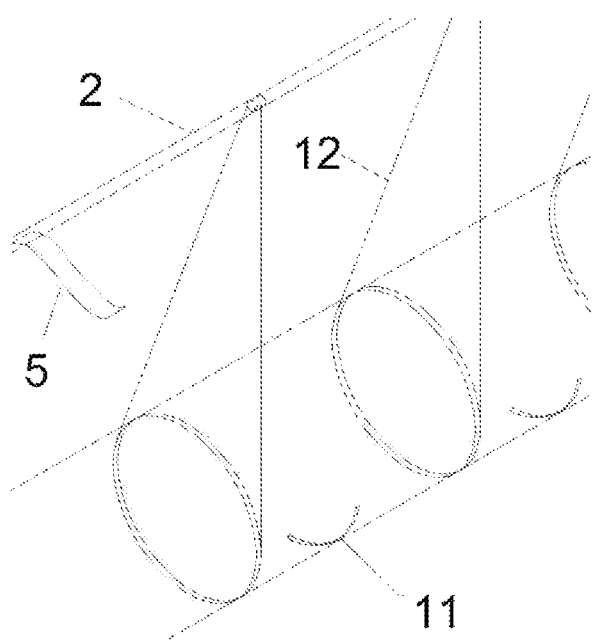
FIG. 2 is a partial enlarged drawing of a fiber air pipe the present disclosure.

As shown in FIG. 2, the diameter of the fiber air pipe 1 provided by the embodiment can be 80 cm; wherein, the precise ventilation fiber air pipe 1 comprises a plurality of air supply outlets 11, the projection size of each air supply outlet 11 is 50 cm*2.6 cm, and the distance between every two adjacent air supply outlets 11 is the width of a cow bed (1.2 m in the embodiment), so that one-to-one correspondence between the air supply outlets 11 and the cow bed is guaranteed.

According to the embodiment, through fluid mechanics calculation software simulation, the size of the air supply outlet 11 is the size most suitable for implementing precise ventilation of the dairy cow fence areas.

The adjusting assembly 2 provided by the embodiment is located at the position 1 m above the fiber air pipe 1, and the adjusting assembly 2 is connected together with the fiber air pipe 1 through a plurality of connecting ropes 12; the adjusting assembly 2 comprises a horizontal displacement adjusting mechanism and a circumferential rotating mechanism, the horizontal displacement adjusting mechanism is a linear stepping motor, the circumferential rotating mechanism is a common motor, and the circumferential rotating mechanism is nested in the horizontal displacement adjusting mechanism; when the system carries out horizontal displacement adjustment on the fiber air pipe 1, that is, when the horizontal displacement adjustment mechanism works, the circumferential rotating mechanism horizontally moves along with an adjusted part; when the system carries out circumferential adjustment on the fiber air pipe 1, that is, when the circumferential rotating mechanism works, the fiber air pipe 1 carries out circumferential rotation and drives the air supply outlets 11 to rotate by changing the lengths of the connecting ropes 12 hung on the two sides of the fiber air pipe 1.

The air cooler 3 provided by the embodiment comprises an air inlet, a sprayer, a fan and an air outlet. Wherein, the air inlet is provided with an air filtering assembly, and cooling liquid of the sprayer is circulating water. In addition, a wet curtain device is further arranged on the air cooler 3 and used for cooling the air at the air inlet.

In addition to the air cooler, in the embodiment, an air-soil exchanger or a ground source heat pump can be adopted to communicate with the input end of the air pipe, and cool air conveying is achieved.

Image analysis software based on machine vision is arranged in the camera 4 provided by the embodiment.

The light ribbon 5 provided by the present embodiment is placed above each cow fence, and specifically can be installed on the adjusting assembly 2. Firstly, the floating angles and the floating directions of the light ribbons are shot in real time through the camera, then the floating angles and the floating directions of the light ribbons are input into the image analysis software based on machine vision, and the air flow direction and the air flow speed of the cow fence areas are calculated.

The controller provided by the embodiment is respectively connected with the camera 4, a temperature and humidity sensor, the adjusting assembly 2, the air cooler 3 and air supply outlet valves (the air supply outlet valves are arranged at the air supply outlets and used for controlling the opening degrees of the air supply outlets); the controller can control the adjusting assembly 2 and the air supply outlet valves according to the air flow conditions and dairy cow posture information provided by the camera 4, then the opening, closing and orientations of the air supply outlets 11 are adjusted in real time, the controller can control the air cooler 3 to work according to cow house temperatures collected by the temperature and humidity sensor, and then the air speeds of the air supply outlets 11 are controlled. Wherein, the air flow conditions include air flow direction and air flow speed; the dairy cow posture information comprises whether dairy cows exist in fences and the standing and lying information of the dairy cows.

In this embodiment, except that the air cooler 3 is installed outside the cow house, other components are all installed inside the cow house. In order to improve the control precision, a plurality of light ribbons 5 can be arranged, and the camera 4 can carry out video monitoring on the light ribbons 5 at the same time and acquire wind speed information.

The workflow of the cow house self-adaptive precise ventilation system provided by the embodiment comprises the following steps:

Step one, installing the light ribbons for measuring wind speed above cow fences, wherein under different air flows, the light ribbons float at certain angles and directions.

Step two, shooting the floating conditions of the light ribbons, the condition of dairy cows in the fences and the current posture of the dairy cows in the fences through the camera installed at one end of each of the light ribbons, and then judging the air flow direction and the air flow speed above the precise ventilation fences through the image analysis software based on machine vision matched with the camera, meanwhile, analyzing whether the dairy cows exist in the fences and the standing and lying conditions of the dairy cows, and transmitting related data to the downstream controller in real time.

Step three, receiving the air flow direction, the air flow speed, the dairy cow in-fence conditions and the dairy cow in-fence posture conditions by the controller, determining whether the air supply outlets are opened or not, the opening directions according to related information, and transmitting related execution data to the adjusting assembly, wherein specifically, whether the air supply outlets are opened or not is determined according to the in-fence conditions of the dairy cows; if the dairy cows are in the fences, the air supply outlets are opened, otherwise, the air supply outlets are closed; the opening widths of the air supply outlets are adjusted according to the standing and lying information of the dairy cows; if the dairy cows stand, the widths of the air supply outlets are correspondingly increased, and if the dairy cows lie down, the air supply outlets are correspondingly decreased to ensure that the speed of jet flow reaching the area where the dairy cows are located is appropriate; and the fiber air pipe is circumferentially and/or axially adjusted according to the flow speed and flow direction information of the background air flow, so that jet flow can effectively act on the area where the dairy cows are located.

Step four, adjusting the horizontal displacement and the circumferential rotation of the air supply outlets by the adjusting assembly according to the decision of the controller.

Step five, starting the air cooler, cooling external hot air through a wet curtain device on the air cooler, and then precisely conveying cooled fresh air to the cow house fences through the adjusted air supply outlets.

The embodiment of the present disclosure innovatively provides an implementation mode of precise ventilation of the cow house, meanwhile, machine vision means is adopted to determine a ventilation strategy, and an energy-saving and intelligent ventilation and cooling system is provided for an open-type scattered fence feeding dairy cow house.

Embodiment II

Figure 3:
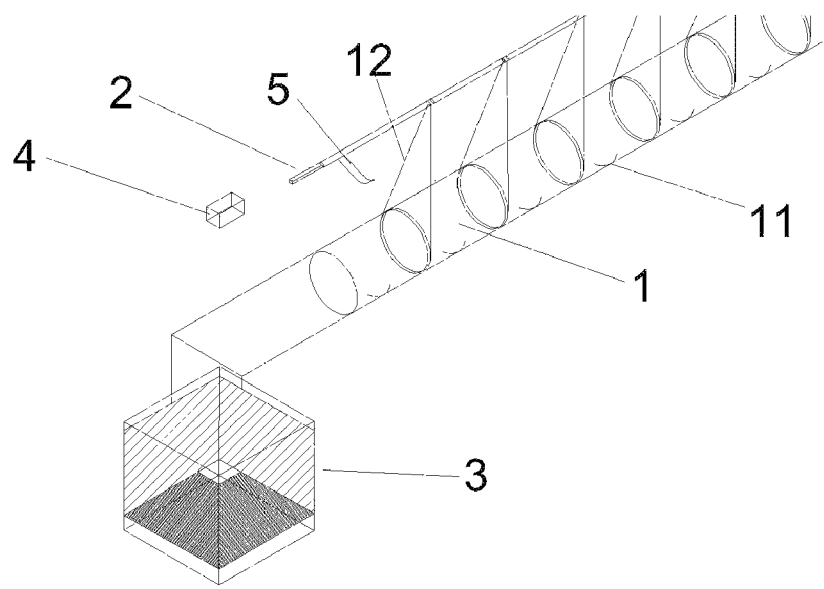
FIG. 3 is a structural schematic diagram of a self-adaptive precise ventilation system for a livestock and poultry house in the present disclosure.
Figure 4:
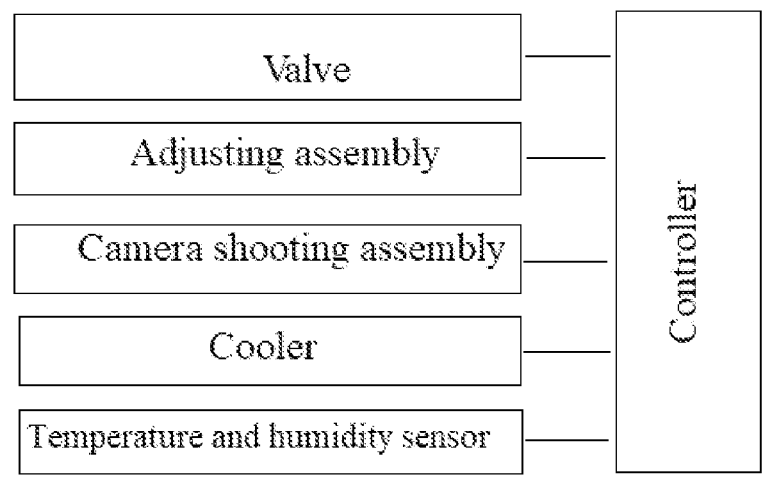
FIG. 4 is an electrical control structure chart of a self-adaptive precise ventilation system for a livestock and poultry house in the present disclosure.

As shown in FIG. 3 and FIG. 4, the embodiment provides a self-adaptive precise ventilation system for a livestock and poultry house. The livestock and poultry house is provided with a plurality of fence areas; and the self-adaptive precise ventilation system for a livestock and poultry house comprises an air pipe 1, an adjusting assembly 2, a camera shooting assembly, air flow test pieces and a controller.

The air pipe 1 and the air flow test pieces are all arranged above the fence areas, and the camera shooting assembly is installed on one side of each of the air flow test pieces. Wherein, a plurality of air supply outlets 11 are formed in the air pipe 1, and each air supply outlet 11 is provided with a valve.

Preferably, the number of the air supply outlets 11 is the same as that of the in-fence areas, and the air supply outlets 11 are in one-to-one correspondence with the in-fence areas. The size of the air supply outlet 11 is determined through fluid mechanics calculation software simulation.

The adjusting assembly 2 is connected together with the air pipe 1 through connecting ropes 12; and specifically, the two ends of the connecting rope 12 are tied to the adjusting assembly 2 to form an annular rope, and the air pipe 1 penetrates through all the annular ropes, so that the adjusting assembly 2 is connected together with the air pipe 2 through a plurality of connecting ropes. Wherein, a connecting rope 12 is arranged between every two adjacent air supply outlets 11.

Preferably, the air flow test piece is a light ribbon 5; and the air pipe 1 is a fiber air pipe.

The camera shooting assembly is used for processing collected air flow test piece images, and determining air flow information in the livestock and poultry house, wherein the air flow information comprises the air flow speed and the air flow direction; and processing collected in-fence area images, and determining in-fence area information in the livestock and poultry house, wherein the in-fence area information comprises whether livestock animals exist in each in-fence area or not and the posture information (standing or lying information) of the livestock animals when the livestock animals exist in the in-fence areas; and the controller is used for acquiring the air flow information and the in-fence area information;

controlling the valves to work based on the in-fence area information, and then adjusting the opening degrees of the air supply outlets; and controlling the adjusting assembly to work based on the air flow information, and then adjusting the orientations of the air supply outlets.

Further, according to the embodiment, in the aspect of controlling the valves to work based on the in-fence area information and then adjusting the opening degrees of the air supply outlets, the controller is used for controlling the valves corresponding to calibrated in-fence areas to start to work when the livestock animals to exist in the calibrated in-fence areas, increasing the opening degrees of the air supply outlets through the valves corresponding to the calibrated in-fence areas when the posture information of the livestock animals in the calibrated in-fence areas is a standing posture, and decreasing the opening degrees of the air supply outlets through the valves corresponding to the calibrated in-fence areas when the posture information of the livestock animals in the calibrated in-fence areas is a lying posture, wherein the calibrated in-fence areas are arbitrary in-fence areas; and according to the embodiment, in the aspect of controlling the adjusting assembly to work based on the air flow information and then adjusting the orientations of the air supply outlets, the controller is used for controlling the adjusting assembly to work based on the air flow information so as to circumferentially and/or axially adjust the air pipe, so that the air flow acts on the calibrated in-fence areas.

Further, the self-adaptive precise ventilation system for a livestock and poultry house further comprises a cooling air supply device communicating with the input end of the air pipe 1 and a temperature and humidity sensor arranged in the livestock and poultry house.

The temperature and humidity sensor is used for acquiring temperature and humidity information in the livestock and poultry house.

The controller is used for acquiring the temperature and humidity information and controlling the cooling air supply device to work according to the temperature and humidity information so as to adjust the air speed output by the air supply outlets.

Further, according to the embodiment, the adjusting assembly 2 comprises a horizontal displacement adjusting mechanism and a circumferential rotating mechanism; and the circumferential rotating mechanism is nested in the horizontal displacement adjusting mechanism.

When the horizontal displacement adjusting mechanism works, the circumferential rotating mechanism moves horizontally along with the air pipe; and when the circumferential rotating mechanism works, the lengths of the connecting ropes hung on the two sides of the air pipe are changed, so that the air pipe rotates in the circumferential direction and drives the air supply outlets to rotate.

Further, the camera shooting assembly comprises a camera 4 and an auxiliary part connected with the camera 4; and image analysis software based on machine vision is arranged in the camera 4, and the auxiliary part is a processor.

The camera 4 is used for collecting air flow test piece images and in-fence area images;

the auxiliary part runs the image analysis software based on machine vision to process the air flow test piece images, so as to determine the air flow information in the livestock and poultry house; and the auxiliary part runs the image analysis software based on machine vision to process the in-fence area images, so as to determine the in-fence area information in the livestock and poultry house.

Preferably, according to the embodiment, the cooling air supply device is an air cooler 3, an air-soil exchanger or a ground source heat pump.

Further, the air cooler 3 comprises an air inlet, a sprayer, a fan and an air outlet.

Wherein, the air inlet is provided with an air filtering assembly, and cooling liquid of the sprayer is circulating water.

A wet curtain device is further arranged on the air cooler and used for cooling the temperature of air entering the air inlet.

The present disclosure designs a precise ventilation self-adaptive system, and the system can adjust a ventilation strategy in real time according to the internal air flow conditions of an open-type scattered fence livestock and poultry breeding house so as to realize precise ventilation.

All embodiments in this specification are described in a progressive manner. Each embodiment focuses on differences from other embodiments. For the part that is the same or similar between different embodiments, reference may be made between the embodiments. The device disclosed in the embodiment corresponds to the method disclosed in the embodiment, and therefore the description is relatively brief. Related information refers to descriptions of the related parts in the method.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A self-adaptive precise ventilation system for a livestock and poultry house, wherein the livestock and poultry house is provided with a plurality of fence areas; the self-adaptive precise ventilation system for the livestock and poultry house comprises an air pipe, an adjusting assembly, a camera shooting assembly, air flow test pieces and a controller;

the air pipe and the air flow test pieces are all arranged above the plurality of fence areas, the camera shooting assembly is installed on one side of each of the air flow test pieces, and the adjusting assembly is connected together with the air pipe through connecting ropes; wherein, a plurality of air supply outlets are formed in the air pipe, and each air supply outlet is provided with a valve;

wherein the camera shooting assembly processes collected air flow test piece images, and determines air flow information in the livestock and poultry house, wherein the air flow information comprises air flow speed and air flow direction; and processes collected in-fence area images, and determines in-fence area information in the livestock and poultry house, wherein the in-fence area information comprises whether livestock animals exist in each in-fence area or not and posture information of the livestock animals when the livestock animals exist in in-fence areas; and wherein the controller acquires the air flow information and the in-fence area information;

controls the valves to work based on the in-fence area information, and then adjusts opening degrees of the plurality of air supply outlets; and controls the adjusting assembly to work based on the air flow information, and then adjusts orientations of the plurality of air supply outlets.

2. The self-adaptive precise ventilation system for the livestock and poultry house according to claim 1, further comprising a cooling air supply device communicating with an input end of the air pipe and a temperature and humidity sensor arranged in the livestock and poultry house, wherein the temperature and humidity sensor acquires temperature and humidity information in the livestock and poultry house; and the controller acquires the temperature and humidity information and controls the cooling air supply device to work according to the temperature and humidity information so as to adjust an air speed output by the plurality of air supply outlets.

3. The self-adaptive precise ventilation system for the livestock and poultry house according to claim 1, wherein the number of the plurality of air supply outlets is the same as that of the in-fence areas, and the plurality of air supply outlets are in one-to-one correspondence with the in-fence areas.

4. The self-adaptive precise ventilation system for the livestock and poultry house according to claim 1, wherein a size of the air supply outlet is determined through fluid mechanics calculation software simulation.

5. The self-adaptive precise ventilation system for the livestock and poultry house according to claim 1, wherein two ends of the connecting rope are tied to the adjusting assembly to form an annular rope; the air pipe penetrates through each annular rope, so that the adjusting assembly is connected together with the air pipe through a plurality of connecting ropes; and a connecting rope of the plurality of connecting ropes is arranged between every two adjacent air supply outlets of the plurality of air supply outlets.

6. The self-adaptive precise ventilation system for the livestock and poultry house according to claim 5, wherein the adjusting assembly comprises a horizontal displacement adjusting mechanism and a circumferential rotating mechanism; the circumferential rotating mechanism is nested in the horizontal displacement adjusting mechanism;

when the horizontal displacement adjusting mechanism works, the circumferential rotating mechanism moves horizontally along with the air pipe; and when the circumferential rotating mechanism works, lengths of the connecting ropes hung on two sides of the air pipe are changed, so that the air pipe rotates in a circumferential direction and drives the plurality of air supply outlets to rotate.

7. The self-adaptive precise ventilation system for the livestock and poultry house according to claim 1, wherein the camera shooting assembly comprises a camera and an auxiliary part connected with the camera; image analysis software based on machine vision is arranged in the camera; wherein the camera collects the air flow test piece images and the in-fence area images;

processes the air flow test piece images by adopting the image analysis software based on machine vision to determine the air flow information in the livestock and poultry house; and processes the in-fence area images by adopting the image analysis software based on machine vision to determine the in-fence area information in the livestock and poultry house.

8. The self-adaptive precise ventilation system for the livestock and poultry house according to claim 1, wherein the cooling air supply device is an air cooler, an air-soil exchanger or a ground source heat pump.

9. The self-adaptive precise ventilation system for the livestock and poultry house according to claim 1, wherein in the aspect of controlling the valves to work based on the in-fence area information and then adjusting the opening degrees of the plurality of air supply outlets, wherein the controller controls the valves corresponding to calibrated in-fence areas to start to work when the livestock animals to exist in the calibrated in-fence areas, increases the opening degrees of the plurality of air supply outlets through the valves corresponding to the calibrated in-fence areas when the posture information of the livestock animals in the calibrated in-fence areas is a standing posture, and decreases the opening degrees of the plurality of air supply outlets through the valves corresponding to the calibrated in-fence areas when the posture information of the livestock animals in the calibrated in-fence areas is a lying posture, wherein the calibrated in-fence areas are arbitrary in-fence areas; and in the aspect of controlling the adjusting assembly to work based on the air flow information and then adjusting the orientations of the air supply outlets, the controller controls the adjusting assembly to work based on the air flow information so as to circumferentially and/or axially adjust the air pipe, so that the air flow acts on the calibrated in-fence areas.

10. The self-adaptive precise ventilation system for the livestock and poultry house according to claim 1, wherein the air flow test pieces are light ribbons; and the air pipe is a fiber air pipe.

* * * * *